US007009721B1

(12) United States Patent
Murata

(10) Patent No.: US 7,009,721 B1
(45) Date of Patent: Mar. 7, 2006

(54) COMMUNICATION TERMINAL DEVICE

(75) Inventor: Yoshinori Murata, Tenri (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/518,625

(22) Filed: Mar. 3, 2000

(30) Foreign Application Priority Data

Mar. 5, 1999 (JP) .................................. 11-058597

(51) Int. Cl.
G06F 15/00 (2006.01)
H04N 1/00 (2006.01)
H04N 1/32 (2006.01)

(52) U.S. Cl. ..................... 358/1.15; 358/434; 358/435; 358/437; 358/439; 358/468; 358/404

(58) Field of Classification Search ............... 358/404, 358/434–439, 468, 1.15
See application file for complete search history.

(56) References Cited

U.S. PATENT DOCUMENTS

| 5,038,226 A | * | 8/1991 | Nagaishi ...................... 358/468 |
| 5,282,050 A | * | 1/1994 | Ishizuka et al. ............. 358/400 |
| 5,726,768 A | * | 3/1998 | Ishikawa et al. ............ 358/442 |
| 5,768,483 A | * | 6/1998 | Maniwa et al. ............. 358/1.15 |
| 5,801,839 A | * | 9/1998 | Ochiai ........................ 358/404 |
| 5,892,587 A | * | 4/1999 | Okada et al. ................ 358/402 |
| 5,896,203 A | * | 4/1999 | Shibata ........................ 358/404 |
| 6,160,631 A | * | 12/2000 | Okimoto et al. ............ 358/1.15 |
| 6,160,636 A | * | 12/2000 | Nagano et al. ............. 358/412 |
| 6,417,935 B1 | * | 7/2002 | Saito et al. ................. 358/450 |
| 6,618,749 B1 | * | 9/2003 | Saito et al. ................. 709/207 |

FOREIGN PATENT DOCUMENTS

| JP | 62-268234 | 11/1987 |
| JP | 07-322028 | 12/1995 |
| JP | 08-181812 | 7/1996 |
| JP | 08-336022 | 12/1996 |

* cited by examiner

Primary Examiner—Edward Coles
Assistant Examiner—Chan S. Park
(74) Attorney, Agent, or Firm—Hogan & Hartson, L.L.P.

(57) ABSTRACT

A user uses a control panel (13) to specify quick memory transmission and instruct the machine to begin the procedure. The first page of the document is scanned in by a scanning unit (14) and stored in a image memory (19). Upon storing of the image of the first page of the document in the image memory (19), NCU (17) automatically dials a transmission recipient. Additionally, a monitoring unit (16) allows the user to hear the sounds of the communication signals at the start of transmission. If, during the scanning of a second, third, or later page of a multi-page document, free space in the image memory (19) falls below a given value, then the page at which the memory became full is indicated to the user, thereby indicating the page at which retransmission should begin.

7 Claims, 4 Drawing Sheets

FIG. 4A

ABC CO. 1999. 1. 30 12:00 PAGE XX

FIG. 4B

ABC CO. 1999. 1. 30 12:00 PAGE XX TO BE CONTINUED IN NEXT TRANSMISSION

COMMUNICATION TERMINAL DEVICE

BACKGROUND OF THE INVENTION

1. Field of the Invention

The present invention relates to a communication terminal device provided with a function that first stores and then transmits an image.

2. Description of the Related Art

Memory transmission functions are employed during transmission of a scanned image from a sending machine to a receiving machine. This memory transmission function first stores the image in a memory or the like, and then transmits that image as it is read out from the memory. This allows transmission to be performed without regard to the per-line scanning speed at which the image is scanned by the sending side. Similarly, the receiving side may employ a memory reception function that first stores the received image in a memory or the like before it is printed out. This memory reception function thus allows reception to be performed without regard to the per-line printing rate at which the image is printed by the receiving side. When both the sending side and the receiving side employ such memory transmission and reception functions during transmission, images can be transmitted very quickly.

In conventional memory transmission functions that store the image in a memory before transmitting it, dialing is performed only after all of the pages of the document to be transmitted have been stored in the memory. Thus, a great deal of time is required between the start of scanning and the start of document transmission.

In order to deal with this problem, a dialing method that dials the receiving party as soon as scanning of the document begins has been employed. This method allows transmission of the document to begin without having to wait for scanning of all the pages of the document to be completed, thus reducing the amount of time required until the start of transmission.

But since the size of the memory used to store the document image is limited, the memory may become full in the middle of scanning a page. It could happen even during scanning of the first page of the document. Normally when this happens, the transmission operation is suspended. But if this occurs while the machine is set to perform scanning and transmission simultaneously as in the above-mentioned dialing method, communication charges may be needlessly incurred without transmission of a single page of the document.

Some communication devices perform control such that document is not scanned when little space is left in the memory, but when the document is very big, or very data-intensive, such as documents that contain photographs and the like, the memory may still become full during scanning. On the other hand, when the machines are set such that they never run out of memory, small memories cannot be utilized efficiently.

SUMMARY OF THE INVENTION

It is thus an object of the present invention to provide a communication terminal device that reduces the amount of time required from the start of scanning a document for transmission until the start of transmission of the document, and eliminates unnecessary communication charges that would otherwise be incurred when it is impossible to transmit even a full page of the document.

In order to accomplish this object, the present invention provides a communication terminal device including a document input means for obtaining an image to be transmitted, an image storage means for storing images obtained by the document input means, a communication control means capable of communicating with a remote machine over a communication line or network, and a control means for initiating dialing from the communication control means to a transmission recipient when at least one page worth of image data has been obtained from the document input means and stored in the image storage means. Since dialing of the receiving party is initiated only after storage of at least one page of document image in the image storage means, the amount of time required from the start of document scanning to the start of data transmission is shorter than when dialing is initiated only after all pages of the document have been scanned. Further, the receiving party is dialed only after at least one page of the document to be transmitted has been stored in the image storage means, thereby ensuring that at least one page of the document is transmitted when the recipient is dialed, and thereby ensuring that communication charges are not needlessly incurred for untransmitted pages. The problem of dialing the remote machine but transmitting nothing can be avoided.

The control means may indicate an incompletely stored page number to a user when, after the communication control means has dialed the recipient, the amount of space available in the image storage means falls within a predetermined value or when there is no space available in the image storage means. This enables the user to quickly learn the page from which transmission must be resumed.

A monitoring means that enables a user to monitor the communication line may further be provided, and the control means may activate the monitoring means when the communication control means initiates dialing. This will inform the user of a fact that dialing has been performed after storing at least one page of a document, thereby putting the user's mind at ease.

BRIEF DESCRIPTION OF THE DRAWINGS

FIG. 4 shows an example of transmission originator information.

DETAILED DESCRIPTION OF THE INVENTION

Figure 1:
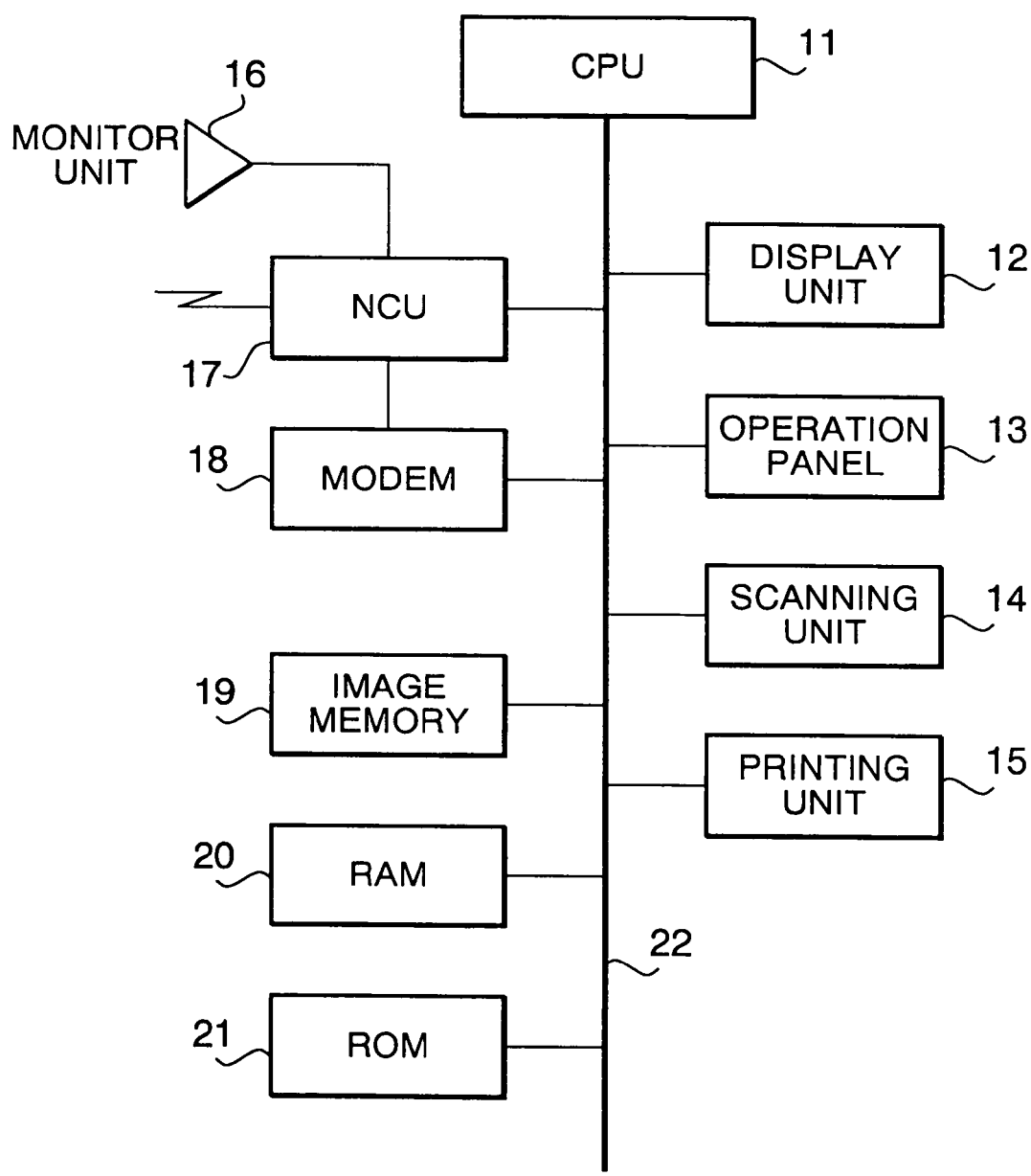
FIG. 1 is a block diagram of an embodiment of the communication terminal device of the present invention.

Referring to FIG. 1, illustrated is a communication terminal device of the present invention that includes a CPU 11, a display unit 12, an operation panel 13, a scanning unit 14, a printing unit 15, a monitor unit 16, an NCU 17, a modem 18, an image memory 19, a RAM 20, a ROM 21, and a BUS 22.

The CPU 11 controls the entire device, executes the various functions of the machine, the functions including at the very least an image transmission function. (Naturally, the CPU 11 may also perform other functions, such as reception and copying.) The transmission function includes a memory transmission function that transmits the image of a document through the modem 18 and NCU 17 after the document has first been scanned by the scanning unit 12 and stored in the image memory 19. A quick memory transmission function may also be provided such that as soon as one page of a document scanned by the scanning unit 14 is stored in the image memory 19, NCU 17 performs a dialing function to automatically dial the recipient. Additionally, as soon as dialing is initiated, the monitor unit 16 may be activated, enabling the user to monitor a communication line signal during dialing. Moreover, the quick memory transmission function may be performed such that the scanning of additional pages (after the first page) of the document by the scanning unit 14 is performed as the data is simultaneously transmitted through the NCU 17 and modem 18.

The display unit 12 may display various information, such as messages to the user, the status of the machine, and operational guidance. The operation panel 13 is used by the user to set the various functions of the machine and to give the machine operating instructions. The user may activate the quick memory transmission function from the operation panel 13.

The scanning unit 14 may be any suitable input device such as an image scanner and a digital camera. In the present embodiment, the scanning unit 14 constitutes one of the image input means. The printing means 15 prints an image (a received image or an image scanned by the scanning unit 14, for example) onto printing paper as directed by the CPU 11.

The monitor unit 16 outputs a communication line signal to the user enabling the user to monitor the signal. The unit 16 may be a speaker, a light emitting diode (LED), or similar type of output device. For example, during monitoring of the communication line signal during dialing, the sound of a dial pulse, tone signal, or similar audio stimulus may be output, thereby enabling the user to determine the status of the communication line.

NCU 17 controls the communication line, transmitting and receiving data to and from a remote device. It is also provided with an automatic dialing function that may automatically dial the telephone number of the recipient as set at the operation panel 13. The modem 18 modulates and demodulates image data to be sent to and received from a remote party.

The image memory 19 stores image data including data for transmission, data received from remote parties, data scanned by the scanning unit 14, data to be printed by the printing unit 15, and data to be used in other processing.

RAM 20 stores data that needs to be used for processing by the CPU 11 and other parts of the machine. ROM 21 stores programs that direct the operation of CPU 11 and permanent machine data.

The bus 22 interconnects the various parts of the machine including CPU 11, display unit 12, operation panel 13, scanning unit 14, printing unit 15, NCU 17, modem 18, image memory 19, RAM 20, and ROM 21. Data is passed along between these parts over BUS 22.

Figure 2:
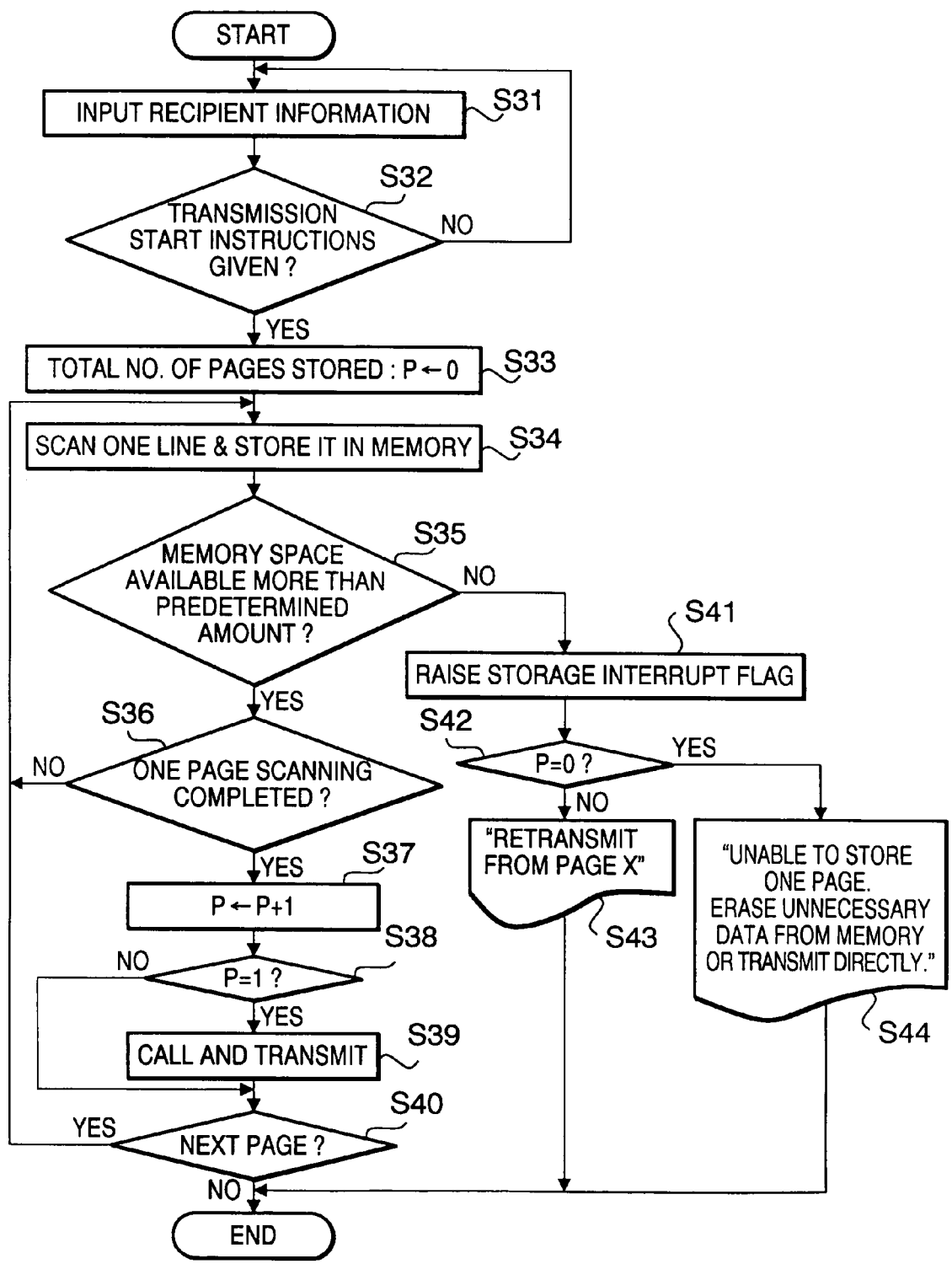
FIG. 2 is a flow chart showing an example of the processing executed by the communication terminal device shown in FIG. 1.

FIG. 2 is a flow chart showing an example of the processing performed in the communication terminal device. This flow chart shows an example of the processing performed when the quick memory transmission function is executed, transmitting the image of a document loaded at the scanning unit 14.

At step S31, a user inputs information about a recipient. The user may, for example, enter the telephone or fax number of the recipient through a numeric key pad on the operation panel 13, or press a single "one-touch dialing" key that is pre-set to the number of the intended recipient. Alternatively, the user may specify a recipient through a quick dial operation wherein the user presses both a quick-dial key and one or more numeric keys on the numeric key pad.

At step S32, the CPU 11 determines whether or not a transmission start instruction has been given. If additional instructions are input without the transmission start instruction having been given, it is determined that an additional recipient is being specified, and the program returns to step S31 to receive the additional input. This loop thus allows a plurality of transmission recipients to be specified. It should be noted that the communication terminal device may be configured to be able to select only one recipient. In such a configuration, the program can be set to allow the user to return to step S31 to correct a mistakenly input recipient.

Once the recipient(s) have been specified and the transmission start instruction has been given, a variable P which indicates the total number of pages stored is set to 0 at step S33, and scanning of the document by the scanning unit 14 is initiated.

At step S34 one line of the document is scanned, encoded by either the CPU 11 or another specialized unit not shown in the drawings, and stored in the image memory 19. Next, at step S35, CPU 11 determines whether or not there is at least a predetermined amount of space still available in the image memory 19. If so, then scanning continues, and at step S36 the CPU 11 determines whether or not scanning of one full page has been completed. If not (if in the middle of scanning a page of document), then the program returns to step S34 to read the next scan line.

Scanning and storage in the image memory 19 of each line of the document is thus repeated until one page has been complete scanned, whereupon the program proceeds to step S37 and increases the value of P by 1. Next, at step S38, it is determined whether or not P is 1 (or in other words, whether or not it is the first page of the document that has just been scanned). If so, the program proceeds to step S39, the NCU 17 is directed to start dialing the recipient, and the transmission process is initiated. This transmission process will be described later in reference to FIG. 3.

Transmission is therefore initiated without having to wait for scanning of the entire document to be completed. Additionally, since at least one page of the document has been stored in the image memory 19 when dialing is initiated, at least one page of the document can be sent when the transmission process begins. This means that the recipient is not dialed when there is nothing to be transmitted, and communication charges are not needlessly incurred.

When the value of P is not 1 (in other words, when the it is not the first page of the document, but the second or later page that has just been scanned), transmission is already being performed at that moment, so the program skips step S39 and proceeds directly to step S40.

At step S40, CPU 11 determines whether or not there are any pages remaining to be scanned and stored. If so, the program returns to step S34 and resumes scanning. If, however, all of the pages of the document have been scanned, the scanning procedure is terminated, and the transmission process initiated at step S39 continues.

If after storing one scanned line of a document, encoding it, and storing it in the image memory at step S34, it is determined at step S35 that there is less than a predetermined amount of space available left in the image memory 19, then the scanning of the document is suspended and the program proceeds to step S41. At step S41 a storage interrupt flag is raised, and then at step S42 the value of P (indicating the last complete page stored in the memory) is determined. If the value of P is other than 0 (in this example, equal to or greater than 1), then at step S43 a message is output recommending to the user that the page P+1 be retransmitted. For example, a message that reads "Restart transmission from page X" might be output, wherein X=P+1. The user would then know from what page to restart transmission just from looking at this message. When this message is output at step S43, the image memory 19 contains more than one page worth of image data. In this case, the data stored in the image memory 19 is sent to the recipient page by page.

If it is determined that P=0 at step S42, then the program proceeds to step S44, where a message indicating that the machine was unable to store the first page of the document for transmission is output to the user. Such a message might say "Unable to store one page. Erase unnecessary image data from the memory, or transmit the document directly (direct transmission)," thereby recommending an appropriate course of action to solve the problem. When such a message is output at step S44, the transmission procedure of step S39 has not been initiated, thereby ensuring that communications charges are not needlessly incurred.

The user can erase the data stored in the image memory 19 by performing an operation at the operation panel 13. The previously mentioned "direct transmission" function would transmit the data directly from the scanning unit 14 through the modem 18 and NCU 17, without storing the data in the image memory 19. In this case, since the per-line scanning rate of the scanning unit 14 influences the transmission rate, total transmission time may increase.

At steps S43 and S44, the message to the user may be displayed on the display 12, or printed out from the printer 15. Alternatively, the message may be output as an audio message, or any combination of the foregoing.

Figure 3:
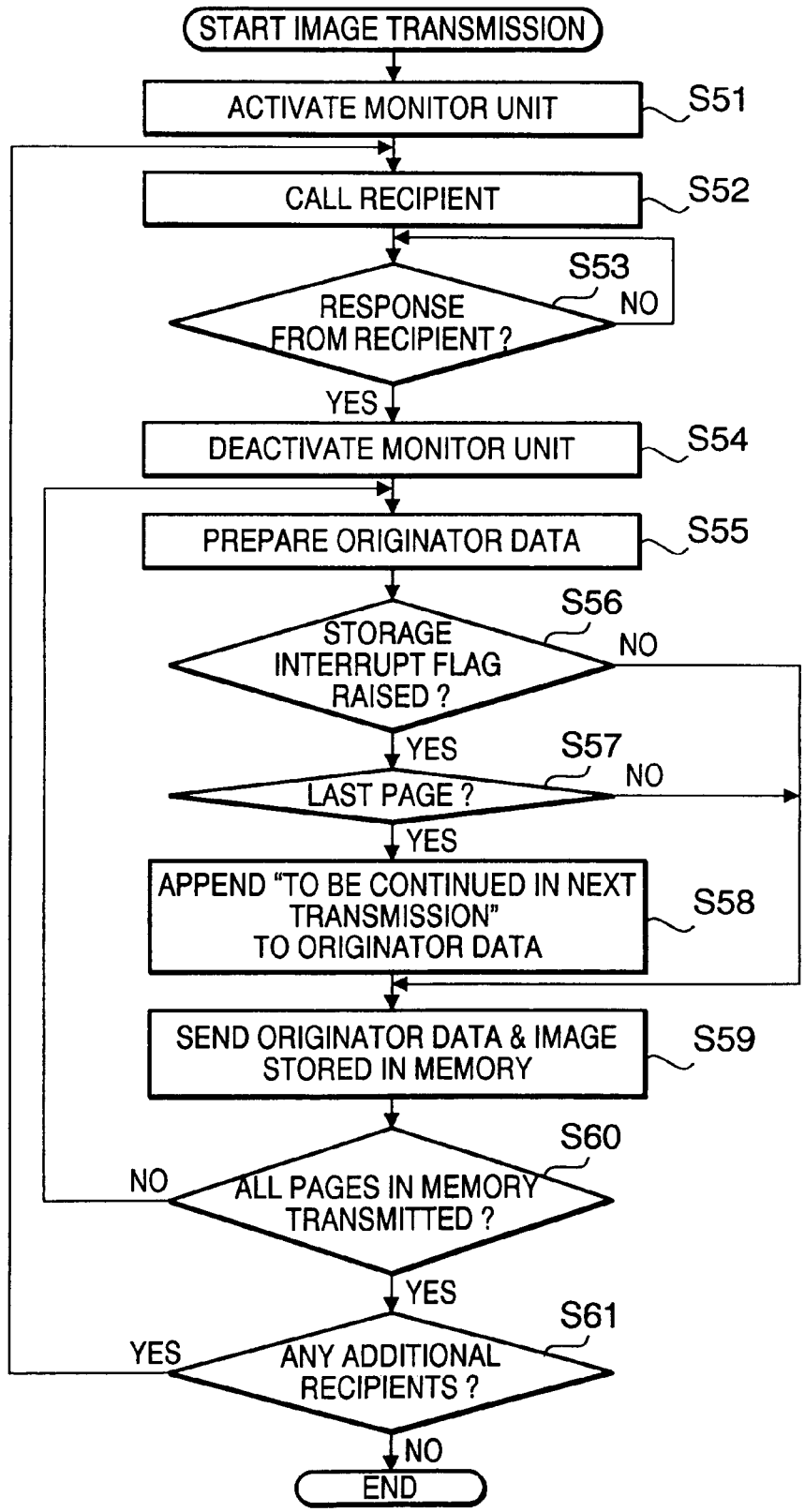
FIG. 3 is a flow chart showing a detailed example of the transmission processing steps in the processing shown in FIG. 2.

Referring to FIG. 3, illustrated is the detail of the transmission processing steps (step S39 in FIG. 2) performed by the communication terminal device of the present invention. As mentioned earlier, this transmission procedure is executed after one page of the document has been stored in the image memory 19.

First, at step S51, monitoring of the communication line signal with the monitor unit 16 is initiated. One page of the document to be transmitted must be scanned in before this transmission procedure can begin. In other words, a certain amount of time elapses between the point at which the start command is given and the point at which this transmission process begins. The initiation of communication line monitoring at the start of the transmission process thereby alleviates any fears the user may have that the document is not being transmitted.

At step S52, NCU 17 dials the fax number of the remote party input at step S31 in FIG. 2. At step S53 the CPU 11 waits for a response from the remote party, and when it receives a response, then at step S54, monitoring is terminated. Next, a handshaking procedure and other necessary procedures are performed with the remote party. If an appropriate response is not received after a predetermined amount of time has elapsed since dialing the remote party (if, for example, the line is busy), then the program may either return to a dial-standby mode (redial mode) or begin dialing any additional transmission recipients.

Once a connection has been established with the remote party, then at step S55 transmission originator information to be appended to the header of the transmitted page is generated. Next, at step S56, it is determined whether or not the storage interruption flag has been raised. If not, then it is understood that the page has been scanned properly, so the program proceeds to step S59, and the document page stored in the image memory 19 is transmitted to the transmission recipient using the transmission originator information created at step S55.

If, however, it is determined that the storage interruption flag has been raised, then it is understood that at step S35 it has been determined that no more than the predetermined amount of space is available in the memory, and that document scanning has been interrupted. In this case, the program proceeds to step S57 and determines whether or not this is the last page of the document scanned. When the last scanned page is transmitted, then at step S58 a message such as "to be continued in the next transmission" is added to the transmission originator data. Next, at step S59, the document page stored in the image memory 19 is transmitted to the transmission recipient along with the transmission originator information.

FIGS. 4A and 4B show examples of the transmission originator information. During normal transmission, for example, transmission originator information such as that shown in FIG. 4A may be generated. On the other hand, when the storage interrupt flag has been raised and the last page of the pages that have been scanned in is transmitted to the recipient, transmission originator information including an additional message such as "to be continued in the next transmission" may be generated as shown in FIG. 4B. Such transmission originator information may then be appended to the document page to be transmitted last, thereby informing the receiving party of a fact that there is still data remaining to be received. All other pages scanned carry the transmission originator information generated at Step 55, as shown in FIG. 4A.

Returning to FIG. 3, after a page of the document has been transmitted, it is determined at step S60 whether or not there are pages left in the image memory 19 that still must be transmitted. If so, then the program returns to step S55 so that once again transmission originator information is generated and the document page is transmitted together with the originator information.

When all of the pages stored in the image memory 19 have been transmitted, then at step S61 CPU 11 determines whether or not there are other transmission recipients. (As shown in FIG. 2, a plurality of recipients may have been specified at steps S31 and S32.) If there are additional specified recipients to whom transmission has not yet been made, then the program returns to step S52 and dials the next one of the recipients. When an additional recipient is dialed, it is assumed that the scanning operation performed by the scanning unit 14 has been completed, and that the user directing the transmission has already left the vicinity of the machine. Thus, during the reiterations of the transmission procedure, the monitor unit 16 might not be activated. Of course, however, the program can be made to loop back to step S51, and the monitor unit 16 can be activated for each iteration, if desired so. In any event, the transmission procedure can be repeated for each of the remaining recipients subsequently, and the document data stored in the image memory 19 is transmitted to all of the recipients in turn.

It should be noted that although the embodiment described hereinabove discloses that the recipient is dialed as soon as the first page of the document is scanned and stored in the image memory 19, the program may be comprised such that the receiving party is dialed only after it has been confirmed that two or more pages of a multi-page document have been scanned and stored. It is also conceivable that the program may transmit a partially scanned page when the amount of space available in the image memory 19 falls within the predetermined level during processing of the first page, but since documents are normally handled as entire pages, it is presumed that in most cases transmission of only a partial page will result in that page having to be retransmitted. For this reason, it is considered advantageous to treat scanned pages in entire page units. In the present embodiment, consequently, the transmission procedure is initiated only upon storage of an entire page worth of data in the image memory 19.

Further, the description hereinabove discloses that the scanning unit 14 is employed as the document input means, and that an image is first obtained by the scanning unit 14 and stored in the image memory 19 before being transmitted. Alternatively, an external interface (not shown in the diagram) may be provided as the document input means. Specifically, the external interface may receive multi-page-worth of image data generated by a computer external to the machine of the present invention, and load pages of this image data into the image memory 19 before the pages are transmitted.

The illustrated and described communication terminal device is disclosed in Japanese Patent Application No. 11-58597 filed on Mar. 5, 1999 and the instant application claims priority of this Japanese Patent Application, the entire disclosure thereof being incorporated herein by reference.

The invention claimed is:

1. A communication terminal device comprising:

document input means for obtaining a page of an image comprising a plurality of pages to be transmitted;

image storage means for storing at least a first page of the image obtained by the document input means;

communication control means capable of communicating with a recipient over a communication line or network; and control means for causing the communication control means to automatically initiate dialing to the recipient when the first page of the plurality of pages of the image has been obtained from the document input means and stored in the image storage means, wherein the control means indicates an incompletely stored page number to a user and appends a message to a document page to be transmitted last to inform the recipient that there are still additional pages remaining to be received when, after the communication control means has dialed the recipient, an amount of space available in the image storage means falls below a predetermined value.

2. A communication terminal device comprising:

document input means for obtaining a page of an image comprising a plurality of pages to be transmitted;

image storage means for storing at least a first page of the image obtained by the document input means;

communication control means capable of communicating with a recipient over a communication line or network; and control means for causing the communication control means to automatically initiate dialing to the recipient when the first page of the plurality of pages of the image has been obtained from the document input means and stored in the image storage means, wherein the control means indicates an incompletely stored page number to a user and appends a message to a document page to be transmitted last to inform the recipient that there are still additional pages remaining to be received when, after the communication control means has dialed the recipient, the image storage means becomes full.

3. The communication terminal device of claim 1 further including monitoring means for enabling a user to monitor the communication line or network, and wherein the control means activates the monitoring means when the communication control means initiates dialing.

4. The communication terminal device of claim 2 further comprising monitoring means for enabling a user to monitor the communication line or network, and wherein the control means activates the monitoring means when the communication control means initiates dialing.

5. The communication terminal device of claim 1 wherein if one page of an image cannot be stored, the device informs the user of this fact.

6. The communication terminal device of claim 5 wherein when the device informs the user, the device suggests an alternative transmission method.

7. The communication terminal device of claim 1 wherein scanning and transmission are performed simultaneously starting from a second page of the document.

* * * * *